United States Patent [19]

Buck et al.

[11] 4,335,601

[45] Jun. 22, 1982

[54] FUEL INJECTION NOZZLE WITH MOVEMENT SWITCH

[75] Inventors: Rainer Buck, Tamm; Odon Kopse; Nestor R. Amaya, both of Stuttgart, all of Fed. Rep. of Germany

[73] Assignee: Robert Bosch GmbH, Stuttgart, Fed. Rep. of Germany

[21] Appl. No.: 170,223

[22] Filed: Jul. 18, 1980

[30] Foreign Application Priority Data

Sep. 28, 1979 [DE] Fed. Rep. of Germany ....... 2939274

[51] Int. Cl.[3] .............................................. G01M 19/00

[52] U.S. Cl. ............................ 73/119 A; 200/61.45 R; 200/83 Q

[58] Field of Search ............................ 73/119 A, 168; 200/61.45 R, 83 Q, DIG. 31

[56] References Cited

U.S. PATENT DOCUMENTS 3,942,366 3/1976 Hofmann .......................... 73/119 A 4,181,010 1/1980 Knape et al. ..................... 73/119 A

*Primary Examiner*—Jerry W. Myracle

*Attorney, Agent, or Firm*—Edwin E. Greigg

[57] ABSTRACT

An electro-mechanical switch, which is part of an electrical current circuit, is disposed in a fuel injection nozzle for internal combustion engines. The first switch contact is secured via an insulating body of a pressure bolt of the nozzle needle; the second switch contact is held pressed against the first switch contact by a contact spring supported on the pressure bolt, so that the portion of the electrical current circuit comprising the nozzle is closed. At the beginning of the opening stroke of the nozzle needle, the second switch contact, because of its inertia of mass, briefly fails to follow the first contact so that the electrical current circuit is interrupted; it is closed by the followup of the first switch contact caused by the contact spring. The switch can be inserted inside a normal injection nozzle without great expense.

5 Claims, 2 Drawing Figures

FUEL INJECTION NOZZLE WITH MOVEMENT SWITCH

BACKGROUND OF THE INVENTION

Fuel injection nozzles are equipped as so-called needle-stroke transducers, in order to indicate the onset of injection by means of a signal which is carried further to a testing device. The opening and closing of an electrical current circuit—that is, switching between zero voltage and the supply voltage—by a switch actuated by the nozzle needle is made use of in many cases, because the switch can be easily built into mass-produced injection nozzles without requiring extra space.

It is particularly favorable to bring the valve seat of the nozzle body and the valve cone of the nozzle needle into play as a mechanical switch, but in that case, there are problems of insulation which are not yet satisfactorily solved.

OBJECT AND SUMMARY OF THE INVENTION

The problem discussed above is solved with simple means in the fuel injection nozzle according to the invention. The fundamental concept of the invention is to utilize the forces of acceleration brought about by the opening stroke of the nozzle needle for the switching movement and at the same time for the opening and closing of the electrical current circuit. Insulating the two contact elements of the switch from each other can be effected at little expense and in a reliable manner.

Advantageous further embodiments of the invention are described herein. With the embodiment of the injection nozzle as defined, a compact switch is created which can be disposed inside the compression spring. With a modification of the injection nozzle, the contact elements of the switch are disposed in a protected manner and they are reliably guided.

If the spring chamber of the injection nozzle is at the same time the oil leakage chamber, then the interior of the insulating body which contains the switch cannot be kept free of leaked oil over the long term; it is assured that leakage oil which has found its way into the interior does not impair the switching movements.

The invention will be better understood and further objects and advantages thereof will become more apparent from the ensuing detailed description of a preferred embodiment taken in conjunction with the drawings.

BRIEF DESCRIPTION OF THE DRAWINGS

The drawings, in axial section and on an enlarged scale, show in cross section in FIG. 1, a fuel injection nozzle for internal combustion engines having a switch.

DESCRIPTION OF THE PREFERRED EMBODIMENT

Figure 1:
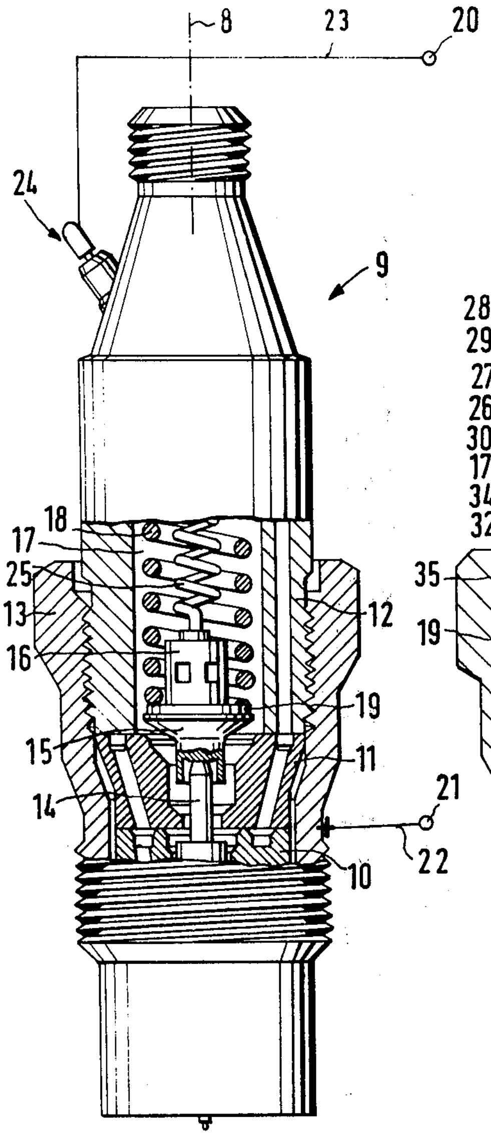

The injection nozzle 9 in FIG. 1, acting as an injection valve, is substantially rotationally symmetrical relative to its axis 8 and has a nozzle body 10, an intermediate plate 11 and a nozzle holder 12, which are held together by a sleeve nut 13. A nozzle needle 14 guided in the nozzle body 10 rests on a pressure element 15, on which an insulating body 16 is secured. One end section of a compression spring 18 is supported on the bottom (not visible in the drawing) of a spring chamber 17 in the nozzle holder 12, and the second end section of this compression spring 18 presses against an outer flange 19 of the insulating body 16.

A first portion, not shown, of an electrical current circuit is connected to two terminals 20, 21, and the second portion of this circuit is made up of a line 23 with a plug device 24, an adjoining connecting element which is connected to a conductive spring 25, and a line 22, which is connected electrically to the sleeve nut 13, the nozzle body 10, the nozzle needle 14 and the pressure element 15. An electromechanical switch disposed inside the insulating body 16 is part of this portion of the electrical current circuit.

Figure 2:
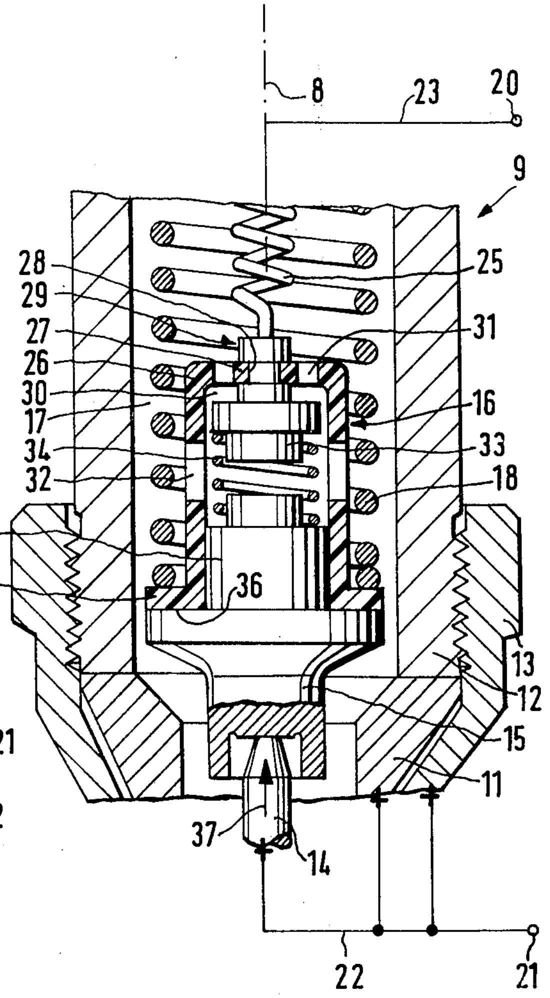
FIG. 2, the switch is shown in cross section and in greater detail.

In the fuel injection nozzle 9 shown only in part in FIG. 2, elements which are identical with or similar to those of FIG. 1 are given identical reference numerals. The insulating body is embodied as cap-like and comprises a cylindrical sheath 26, the outer flange 19 and a member 27. In a bore 28 of the member 27, there is a first switch contact 29, with its contact portion protruding into the interior 30 of the insulating body 16 and its holder portion which contains the conductive spring 25 protruding into the spring chamber 17. A plurality of apertures 31 and 32 are cut out in the member 27 or in the cylindrical sheath 26 of the insulating body 16, so that the leakage oil can freely enter and leave the interior 30 in order not to interfere with the movement of the switch. A second switch contact 33 is disposed in the interior 30, and a contact spring 34 is supported on a protrusion 35 of the pressure element 15 and presses the second switch contact 33 against the first switch contact 29.

The rim 36 of the flange 19 of the insulating body 16 is glued to the pressure member 15, and the compression spring 18 is supported on the flange 19. Instead of being glued, the insulating body 16 can also be secured solely by the force of the compression spring 18 on the pressure member 15. The injection nozzle 9 is shown in the position of rest, in which the contact spring 34 holds the second switch contact 33 continuously pressed against the first switch contact 29.

An opening stroke of the nozzle needle 14 in the direction of the arrow 37 also pushes the first switch contact 29 in the same direction; however, the second switch contact 33, because of its inertia of mass, does not simultaneously perform the same movement when the mass of the switch contact 33 and the spring contacts of the contact spring 34 are correctly adapted to one another. Thus, the two contacts separate at least briefly and accordingly open the electrical current circuit. At the end of the opening stroke, at the latest, the contact spring 34 presses the second switch contact against the first switch contact 29, which causes the electrical current circuit to be closed once again.

The foregoing relates to a preferred exemplary embodiment of the invention, it being understood that other embodiments and variants thereof are possible within the spirit and scope of the invention, the latter being defined by the appended claims.

What is claimed and desired to be secured by Letters Patent of the United States is:

1. A fuel injection nozzle holder for internal combustion engines for ascertaining the onset of fuel injection comprising a nozzle needle, an electrical switch arranged to be actuated by said nozzle needle during an opening stroke of said nozzle needle, said electrical switch including plural contacts whereby movement of at least one of said contacts is limited by its inertia of mass.

2. A nozzle as defined by claim 1 having the following characteristics:

(b) a first of said switch contacts is secured on an insulating body of said nozzle needle and (c) a contact spring is supported on the nozzle needle and presses a second of said switch contacts against said first switch contact.

3. A nozzle having as defined in claim 2 including a pressure element arranged to abut said nozzle said insulating body of said nozzle needle is caplike and further includes a rim which is supported on the pressure element and said second switch contact is secured in a member of said insulating body, and said contact spring is supported on a protrusion of said pressure element.

4. A nozzle as defined by claim 3 having the following characteristic:

(f) said insulating body further includes an outer flange which is pressed against the pressure element by a compression spring.

5. A nozzle as defined by claim 3 having the following characteristic:

(g) said insulating body further includes an interior and at least one means defining openings which connects said interior of said insulating body and said spring chamber of said nozzle holder.

* * * * *